(12) United States Patent
Cernohous et al.

(10) Patent No.: US 8,648,134 B2
(45) Date of Patent: Feb. 11, 2014

(54) POLYMER PROCESSING AIDS

(75) Inventors: Jeffrey J. Cernohous, Hudson, WI (US); William D. Sigworth, Naugatuck, CT (US); Hayder Zahalka, Morgantown, WV (US); Keith A. Hughes, Zionsville, IN (US)

(73) Assignee: Addivant USA LLC, Middlebury, CT (US)

( * ) Notice: Subject to any disclaimer, the term of this patent is extended or adjusted under 35 U.S.C. 154(b) by 159 days.

(21) Appl. No.: 13/263,250

(22) PCT Filed: Jul. 23, 2010

(86) PCT No.: PCT/US2010/042995
§ 371 (c)(1),
(2), (4) Date: Nov. 10, 2011

(87) PCT Pub. No.: WO2011/017021
PCT Pub. Date: Feb. 10, 2011

(65) Prior Publication Data
US 2012/0059102 A1    Mar. 8, 2012

Related U.S. Application Data

(60) Provisional application No. 61/229,213, filed on Jul. 28, 2009.

(51) Int. Cl.
*C08K 5/07* (2006.01)
(52) U.S. Cl.
USPC ............................................. 524/366; 525/90

(58) Field of Classification Search
USPC ............................................. 524/366; 525/90
See application file for complete search history.

(56) References Cited

U.S. PATENT DOCUMENTS

| | | |
|---|---|---|
| 3,125,547 A | 3/1964 | Blatz |
| 3,334,157 A | 8/1967 | Larsen |
| 4,013,622 A | 3/1977 | DeJuneas et al. |
| 4,035,565 A | 7/1977 | Apotheker et al. |
| 4,159,975 A | 7/1979 | Praetorius et al. |
| 4,243,770 A | 1/1981 | Talemoto et al. |
| 4,740,341 A | 4/1988 | Chu |
| 4,855,360 A | 8/1989 | Duchesne et al. |
| 5,010,130 A | 4/1991 | Chapman, Jr. et al. |
| 5,587,429 A | 12/1996 | Priester |
| 5,707,569 A | 1/1998 | Priester et al. |
| 5,830,947 A | 11/1998 | Blong et al. |
| 6,048,939 A | 4/2000 | Priester |
| 6,512,063 B2 | 1/2003 | Tang |
| 6,599,982 B2 | 7/2003 | Oriani |
| 6,610,408 B1 | 8/2003 | Srinivasan et al. |
| 6,642,310 B2 | 11/2003 | Chapman, Jr. et al. |
| 6,774,164 B2 | 8/2004 | Lyons et al. |
| 2005/0101722 A1 | 5/2005 | Briers et al. |

FOREIGN PATENT DOCUMENTS

GB    1567250    5/1980

*Primary Examiner* — Edward Cain
(74) *Attorney, Agent, or Firm* — Dilworth IP, LLC

(57) ABSTRACT

A polymer composition comprises a polymer matrix, a first fluorine-containing processing aid, and a second processing additive system that is substantially free of fluorine and that comprises: (a) a lubricant and (b) a surfactant.

17 Claims, 1 Drawing Sheet

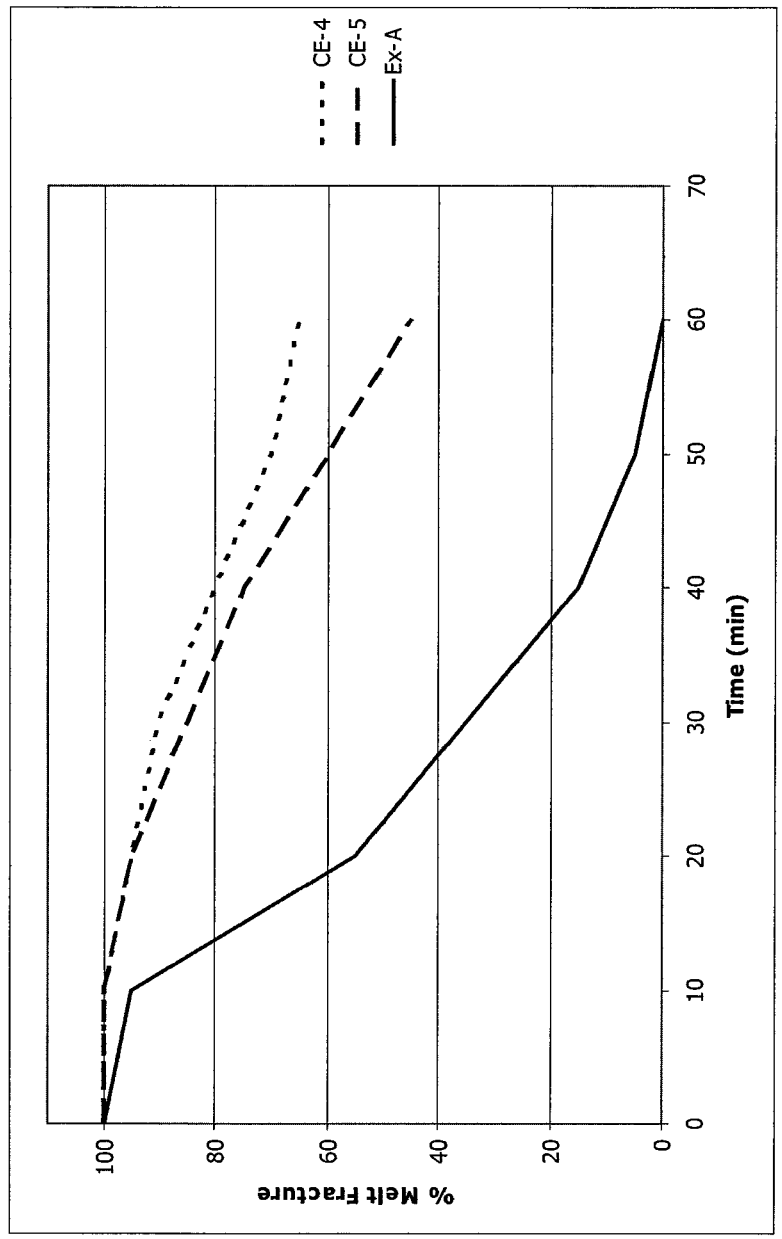

003
POLYMER PROCESSING AIDS

This application is the U.S. national phase of International Application PCT/US10/42995, filed Jul. 23, 2010, claiming the benefit of U.S. Provisional Application No. 61/229,213, filed Jul. 28, 2009.

FIELD

This invention relates to polymer processing aids.

BACKGROUND

Most polymeric materials possess viscoelastic characteristics that, when melt processed, may result in undesirable defects in the finished material. This is particularly evident when a polymer is melt processed above a critical shear rate and can cause the surface of the extrudate to exhibit melt defects (e.g., melt fracture, surface roughness, edge tear, sharkskin). A common melt defect is a rough surface on the extrudate, and is referred to as melt fracture. Melt fracture is primarily a function of the rheology of the polymer and the temperature and speed at which the polymer is processed. This phenomenon is particularly problematic with polymeric materials that contain interfering elements, including fillers. Adding fillers to polymeric systems increases the overall melt viscosity, thus making them more difficult to process and making melt defects more prevalent.

In order to alleviate the problems of melt defects it is well known to add processing aids to polymer materials. The processing aids are believed to function by forming a dynamic coating on the processing equipment and producing interfacial slip between the processing equipment and the polymeric material. Interfacial slip in this instance is defined as the reduction of surface tension, and subsequently shear stress, between the polymer melt and the processing equipment. One known class of processing aids are fluoropolymers, such as homo and copolymers derived from vinylidene difluoride, hexafluoropropylene, and tetrafluoroethylene monomers. Fluoropolymers are known to improve processability and eliminate melt defects in thermoplastics compositions. However, it is also known that fluoropolymers can be less or even non-effective in the presence of additives or fillers having reactive sites, since such materials can have strong interactions with the fluoropolymer, thus preventing it from functioning properly. Thus, much higher levels of fluoropolymer must be utilized to eliminate melt defects from filled polymers, a solution that is often not cost-effective for the application.

International Patent Publication No. WO 2007/136552 discloses a polymer processing additive system which is particularly useful with filled polymers, which avoids the use of fluoropolymers and comprises a lubricant and a surfactant. Suitable lubricants for use with the additive system are said to include poly alkylene oxide oligomers and polymers, whereas suitable surfactants are said to include polyethylene-block-poly alkylene oxide oligomers.

In investigating the properties of fluorine-free polymer processing additive system disclosed in International Patent Publication No. WO 2007/136552, we have now found that the fluorine-free system operates by a different mechanism than conventional fluorine-containing polymer processing aids. Moreover, it has been found that by combining a fluorine-free polymer processing additive system with fluorine-containing processing aid, it is possible to achieve an unexpected and synergistic improvement in the effectiveness of the overall additive to improve processability and eliminate melt defects in thermoplastics compositions. This result not only offers the possibility of more effective processing aids requiring lower usage levels but also, in view of the generally lower cost of the fluorine-free system, should reduce overall polymer processing costs.

U.S. Patent Application Publication No. 2005/0101722, published May 12, 2005, discloses a melt processable composition comprising: (a) one or more thermoplastic hydrocarbon polymers; (b) a fluoropolymer processing aid having (i) poly(oxyalkylene) polymer; and (ii) a fluoropolymer having interpolymerized units of vinylidene fluoride and at least one other monomer wherein the vinylidene fluoride content of the fluoropolymer is greater than 65% by weight, and wherein said melt processable composition upon extrusion achieves an extrudate exhibiting no melt defects at a lower level of said fluoropolymer processing aid when compared to a standard processing aid system.

SUMMARY

In one aspect, the invention resides in a polymer composition comprising a polymer matrix, a first fluorine-containing processing aid, and a second processing additive system that is substantially free of fluorine and that comprises: (a) a lubricant and (b) a surfactant.

Conveniently, the polymer matrix is selected from the group consisting of polyamides, polyimides, polyurethanes, polyolefins, polystyrenes, polyesters, polycarbonates, polyketones, polyureas, polyvinyl resins, polyacrylates, polymethylacrylates and combinations thereof.

Conveniently, the weight ratio of the first fluorine-containing processing aid to the second processing additive system is from about 9:1 to about 1:9.

Conveniently, the first fluorine-containing processing aid is present in an amount up to 2500 ppm, such as from about 200 to about 2,500 ppm, of the polymer composition.

Conveniently, the first fluorine-containing processing aid comprises a fluoropolymer and especially a homo or copolymer derived from vinylidene fluoride, hexafluoropropylene, chlorotrifluoroethylene, tetrafluoroethylene, perfluoroalkyl perfluorovinyl ethers or mixtures thereof.

Conveniently, the second processing aid is present in an amount up to 2500 ppm, such as from about 200 to about 2,500 ppm, of the polymer composition.

In one embodiment, the lubricant of the second processing additive system comprises a polyalkylene oxide oligomer or polymer, typically having a molecular weight of from about 2,000 to about 50,000 g/mol.

In another embodiment, the surfactant of the second processing additive system comprises a polyolefin-block-polyalkylene oxide oligomer, such as a polyethylene-block-polyalkylene oxide oligomer, and typically the oligomer has a molecular weight less than 5,000 g/mol, such as less than 2,500 g/mol, for example less than 1,000 g/mol.

Conveniently, the weight ratio of the lubricant to the surfactant in the second processing additive system is from about 1:1 to about 6:1.

In one embodiment, the second processing additive system further comprises (c) an antioxidant, typically present in an amount between about 0 and about 20 wt % of the total weight of the second processing additive system.

In a further aspect, the invention resides in a method of reducing melt defects produced during melt processing of a polymer matrix, the method comprising blending the polymer matrix with a first fluorine-containing processing aid, and a second processing additive system that is substantially free of fluorine and that comprises: (a) a lubricant and (b) a surfactant.

DESCRIPTION OF THE DRAWINGS

FIG. 1 is a graph of melt fracture against extrusion time for the melt processable blends of Comparative Examples 4 and 5 and Example A.

DESCRIPTION OF THE EMBODIMENTS

The following terms used in this application are defined as follows:

"MELT DEFECTS" means undesirable problems that arise when processing a polymer matrix at elevated temperatures and under shear (e.g., melt fracture, surface roughness, edge tear, sharkskin).

"PROCESSING ADDITIVE" means a material that when added to a formulation improves the melt processibility of the formulation (e.g., reduces melt defects).

"MELT PROCESSABLE COMPOSITION" means a formulation that can be melt processed, typically at elevated temperatures, by means of a conventional polymer processing technique, such as extrusion and injection molding.

"POLYMER" means a series of connected monomeric repeating units (i.e., AAAA) whose overall molecular weight is above the lesser of its critical entanglement molecular weight or a number average molecular weight of 10,000 g/mol.

"SURFACTANT" means an oligomer that improves the dispersion and uniformity of a lubricant in a polymeric matrix, by reducing the interfacial tension between these materials.

"LUBRICANT" means an additive which affects the rheology of the polymer melt in a desirable way.

"OLIGOMER" means a series of connected monomeric repeating units (i.e., AAAA) whose overall molecular weight is below the lesser of the critical entanglement molecular weight known for corresponding homopolymer or a number average molecular weight of 10,000 g/mol.

"BLOCK OLIGOMER" means an oligomer having a structure comprising at least two immiscible blocks of monomeric repeating units (i.e., AAAA-BBBB).

Described herein is a melt processable polymer composition comprising a base polymer matrix blended with (i) a first fluorine-containing processing aid and (ii) a second processing additive system that is substantially free of fluorine and that comprises (a) a lubricant and (b) a surfactant and optionally (c) an antioxidant. Generally, the combination of the processing additives (i) and (ii) system is present in an amount up to 5000 ppm, such as from about 500 to about 5000 ppm, of the overall composition.

A wide variety of polymers conventionally recognized in the art as suitable for melt processing are useful as the polymeric matrix. Examples of suitable polymeric matrices include, but are not limited to, polyamides, polyimides, polyurethanes, polyolefins, polystyrenes, polyesters, polycarbonates, polyketones, polyureas, polyvinyl resins, polyacrylates, polymethylacrylates and mixtures thereof. In a preferred embodiment, the polymer matrix comprises a polyolefin, such as polyethylene or polypropylene. Other suitable polymeric matrices include biopolymers, such as polylactides, starch-based plastics and polyhydroxyalkonates.

The first fluorine-containing processing aid generally comprises a fluoropolymer and especially a homopolymer, copolymer or terpolymer derived from vinylidene fluoride, hexafluoropropylene, chlorotrifluoroethylene, tetrafluoroethylene, perfluoroalkyl perfluorovinyl ethers or mixtures thereof. Specific examples of the fluoropolymers which may be employed include copolymers of vinylidene fluoride and one or more comonomers selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride, all of which are known in the art. In some cases these copolymers may also include bromine-containing comonomers as taught in U.S. Pat. No. 4,035,565, or terminal iodogroups, as taught in U.S. Pat. No. 4,243,770. Preferably the fluoropolymers employed in the first fluorine-containing processing aid contain a fluorine to carbon molar ratio of at least 1:2 and more preferably at least 1:1. Highly preferred fluoropolymers comprise copolymerized units of i) vinylidene fluoride/hexafluoropropylene; ii) vinylidene fluoride/hexafluoropropylene/tetrafluoroethylene; iii) tetrafluoroethylene/propylene; or iv) tetrafluoroethylene/propylene/vinylidene fluoride. Examples of suitable fluoropolymers employed in the present compositions are disclosed in U.S. Pat. Nos. 6,774,164, 6,642,310, 6,610,408, 6,599,982, 6,512,063, 6,048,939, 5,707,569, 5,587,429, 5,010,130, 4,855,360, 4,740,341, 3,334,157, and 3,125,547.

Conveniently, the first fluorine-containing processing aid is present in an amount up to 2500 ppm, such as from about 200 to about 2,500 ppm, for example from 200 to 1000 ppm, of the polymer composition.

The lubricant employed in the second processing additive system can be any of the materials that are conventionally utilized as lubricants in melt processing of polymers. The lubricant may be hydrophobic, hydrophilic or amphiphilic in nature. Non-limiting examples of suitable lubricants include hydrocarbon waxes, metal stearates, stearates, alkyl amides and especially polyalkylene oxides and glycols. Polyethylene oxide polymers are known in the art to have lubricating properties. For example, U.S. Pat. No. 4,159,975 (Praetorius et al.) describes the use of polyethylene glycol (PEG) as a lubricant for thermoplastics. In addition, U.S. Pat. No. 4,013,622 (DeJuneas et al.) describes the utility of PEG as a processing aid for polyethylene film.

In one embodiment, the lubricant comprises a polyalkylene oxide oligomer or polymer, especially a polyethylene oxide oligomer or polymer typically having a molecular weight of from about 2,000 to about 50,000 g/mol, typically from about 5,000 to about 10,000 g/mol.

The surfactant employed in the second processing additive system is generally chosen to be amphiphilic and more particularly to have both hydrophilic and hydrophobic segments. The surfactant is oligomeric and typically is an amphiphilic block oligomer. Suitable surfactants include polyolefin-block-alkylene oxide block oligomers, and end-functionalized polyolefin oligomers (e.g., functionalized with hydroxyl and/or carboxylic acid groups).

In one embodiment, the surfactant comprises a polyethylene-block-polyalkylene oxide oligomer, and especially a polyethylene-block-polyethylene oxide oligomer, typically having a molecular weight less than 5,000 g/mol, such as less than 2,500 g/mol, for example less than 1,000 g/mol.

Conveniently, the second processing additive system is present in an amount up to 2500 ppm, such as from about 200 to about 2,500 ppm, for example from 200 to 1000 ppm, of the polymer composition.

In general, the weight ratio of the lubricant to the surfactant in the second processing additive system is from about 1:1 to about 6:1, such as from about 2:1 to about 4:1.

In addition, the weight ratio of the first fluorine-containing processing aid to the second processing additive system is typically from about 1:9 to about 9:1.

Additional processing additives may also be added to the melt processable composition to impart specific attributes to the final polymer composition. In particular, the second processing additive system may include an antioxidant, which is typically present in an amount between about 0 and about 20 wt % of the total weight of the second processing additive system. Non-limiting examples of other additives include light stabilizers, antiblocking agents, heat stabilizers, biocides, compatibilizers, coupling agents, flame retardants, plasticizers, tackifiers, colorants and pigments.

The melt processable composition can be prepared by any of a variety of ways. For example, the polymer matrix and the components of the processing additives can be combined together by any of the blending means usually employed in the plastics industry, such as with a compounding mill, a Banbury mixer, or a mixing extruder in which the processing additive is uniformly distributed throughout the host polymer. The additive system components and the host polymer may be used in the form of, for example, a powder, a pellet, or a granular product. Typically, the first fluorine-containing processing aid and the second processing additive system are added to the host polymer as master batches mixed with the same or a similar host polymer diluent. The mixing operation is most conveniently carried out at a temperature above the melting point or softening point of the processing additives, although it is also feasible to dry-blend the components in the solid state as particulates and then cause uniform distribution of the components by feeding the dry blend to a twin-screw melt extruder. The resulting melt-blended mixture can be either extruded directly into the form of the final product shape or pelletized or otherwise comminuted into a desired particulate size or size distribution and fed to an extruder, which typically will be a single-screw extruder, that melt-processes the blended mixture to form the final product shape.

Melt-processing typically is performed at a temperature from 180 to 280° C., although optimum operating temperatures are selected depending upon the melting point, melt viscosity, and thermal stability of the composition. Different types of melt processing equipment, such as extruders, may be used to process the present melt processable compositions. Suitable extruders are described, for example, by Rauwendaal, C., "Polymer Extrusion", 4th edition, Hansen-Gardner Publishers, 2001.

The present melt processable compositions may be utilized to make items such as films, building materials and automotive components. Examples include, blown film, cast film, residential decking, automotive interior components, roofing, siding, window components, and decorative trim.

The invention will now be more particularly described with reference to the following non-limiting Examples.

The materials listed in Table 1 below were employed in the Examples.

TABLE 1

| Material | Description |
| --- | --- |
| LLDPE | LLDPE LL1001 resin - MFI of 1 gm/10 minutes per ASTM D1238, additives consisted of the stabilizer package given below. Commercially available from ExxonMobil Chemical Company, Houston, TX. |
| Resin Stabilizer | TNPP—Tris(nonylphenyl)phosphite, added at 1000 ppm by resin supplier. TNPP is available commercially from Chemtura Corporation, Middlebury, CT |

TABLE 1-continued

| Material | Description |
| --- | --- |
| Resin Stabilizer | Anox PP18 - Octadecyl 3-(3',5'di-t-butyl-4'hydroxyphenyl)propionate added at 500 ppm by resin supplier. Anox PP18 is commercially available from Chemtura Corporation, Middlebury, CT |
| Surfactant | Unithox 450, a polyethylene-block-polyethylene oxide oligomer from Baker-Petrolito, Sugarland, TX. |
| Lubricant | Carbowax 8000, a polyethylene glycol polymer available from Dow Chemical, Midland, MI. |
| Stabilizer | Anox 20, Tetrakismethyleno(3,5 di-t-butyl-4-hydroxyhydrocinnamate) methane available from Chemtura Corporation, Middlebury, CT. |
| Fluorinated Polymer Processing Aid | Dyneon FX5920A commercially available from 3M/Dyneon, Oakdale, MN |
| Carrier Resin for Master Batches | Sclair 31E LLDPE - MFI of 10.5 gm/10 minutes per ASTM D1238 and a density of 0.922 gm/cc per ASTM D792. Commercially available from Nova Chemicals Inc, Moontownship, PA. |

Preparation of Non-Fluorinated Polymer Processing Aid

A non-fluorinated polymer processing aid (non-F PPA) was prepared by pre-blending the surfactant, lubricant, and Anox 20 stabilizer of Table 1 in a ratio of 20/70/10 and adding the blend to the main throat of a 27 mm intermeshing co-rotating twin screw extruder with a 36:1 length to diameter ratio using a volumetric feeder and processed through a three strand die (equipment commercially available from American Leistritz Extruder Corporation, Somerville, N.J.). The sample was processed at 250 rpm screw speed at 10 kg/hr using a temperature flat profile of 130° C. for all zones and the die. The resulting strands were ground to a powder where 94% of the particles were less than 2000 microns (10 mesh) using a laboratory grinder (Minigran, commercially available from Dynisco Inc., Morgantown. Pa.).

Preparation of Master Batches

Two master batches were prepared, one containing 95 wt % of the Sclair 31E LLDPE (linear low density polyethylene) and 5 wt % (50,000 ppm) of the Dyneon fluorinated polymer processing aid (F PPA) of Table 1 and the other containing 95 wt % of the Sclair 31 E LLDPE and 5 wt % of the non-fluorinated polymer processing aid (non-F PPA) described above. Each master batch was made in the twin-screw extruder described above using a flat 180° C. temperature profile and a screw speed of 75 rpm.

The higher MFI Sclair 31E resin (having an MFI of 10 as compared with the MFI of 1 for the LLDPE LL1001 host resin) was used as the carrier for the masterbatches to facilitate dispersion in the final formulation.

Comparative Examples 1 to 5

Four separate samples of the ExxonMobil LLDPE LL1001 resin were premixed with varying amounts of the non-F PPA master batch (Comparative Examples 2 and 4) or the F PPA master batch (Comparative Examples 3 and 5) and blended to produce the melt processable compositions listed in Table 2. Blending was effected by feeding each mixture into the main throat of the twin screw extruder described above using a volumetric feeder and a three strand die. The extruder was operated at a screw speed of 250 rpm using a flat temperature profile of 190° C. in all zones and the die. The strands were then pelletized into ⅛" length pellets using a strand pelletizer.

A fifth sample of ExxonMobil LLDPE LL1001 resin alone (Comparative Example 1) was used as a standard.

Examples A to C

Three additional samples of the ExxonMobil LLDPE LL1001 resin were premixed with 0.4 wt % of each of the non-F PPA master batch and the F PPA master batch or 0.2 wt % of each of the non-F PPA master batch and the F PPA master batch and blended to produce the melt processable compositions listed in Table 2. Blending was effected in the same way as for Comparative Examples 2 to 4.

TABLE 2

| Example | LL1001 Resin (%) | MB-NF (%) | MB-F (%) | PPA (ppm) |
| --- | --- | --- | --- | --- |
| CE-1 | 100 | | | 0 |
| CE-2 | 98.4 | 1.6 | | 800 |
| CE-3 | 98.4 | | 1.6 | 800 |
| CE-4 | 99.2 | 0.8 | | 400 |
| CE-5 | 99.2 | | 0.8 | 400 |
| A | 99.2 | 0.4 | 0.4 | 400 |
| B | 99.2 | 0.4 | 0.4 | 400 |
| C | 99.6 | 0.2 | 0.2 | 200 |

Testing of the Samples

The samples were evaluated on a production scale blown film line that consisted of 2½ inch single screw extruder attached to 8 inch diameter blown film die with 0.030 inch gap. The film that was produced, slit and collected on a roll with take-off equipment of a type commonly used in the blown film industry. A temperature profile of 340° F. (171° C.), 420° F. (216° C.), 400° F. (204° C.), 400° F. (204° C.) was used on the 4 barrel sections of the extruder. The die temperature was set at 400° F. (204° C.). A blow ratio of 2.45 was used. Extruder output was adjusted to achieve a shear rate of 300 sec⁻. Samples were run for one hour. During this time, the appearance of the blown film was periodically observed and a visual estimate of percent melt fracture was made. Shear rates were calculated using the equation for annular dies given in H. F. Giles, et al., "Extrusion: The Definite Processing Guide and Handbook," PDL Handbook Series, Elsevier Publishing, 2005, p. 79. The results are summarized in Table 3 and FIG. 1.

Between each sample, the extruder and die were cleaned out to insure that any remaining PPA that had become attached to the surfaces of the equipment during the previous run was removed. A talc/LDPE compound was run for 30 minutes followed by the straight Exxon LLDPE LL1001 resin for an additional 30 minutes. In all cases, the straight Exxon LLDPE resin produced hard melt fracture within 5-10 minutes of running during this clean out procedure.

These results clearly show that blending the non-fluorinated and fluorinated proprietary process aids results in a synergistic combination that clears melt fracture at much lower use levels than either of the process aids by themselves. A loading in excess of 800 ppm is needed when either the non-F PPA or the F PPA are used alone whereas the 50/50 blend of the two types of PPA requires approximately 400 ppm to clear melt fracture. FIG. 1 demonstrates the clear advantage which the blend has over the individual components when all are used at 400 ppm.

TABLE 4

| Example | CE-1 | CE-2 | CE-3 | CE-4 | CE-5 | Ex-A | Ex-B | Ex-C |
| --- | --- | --- | --- | --- | --- | --- | --- | --- |
| ppm Non-F PPA | 0 | 800 | | 400 | | 200 | 200 | 100 |
| ppm F-PPA | 0 | | 800 | | 400 | 200 | 200 | 100 |
| Shear Rate, sec⁻¹ | 320 | 320 | 320 | 300 | 300 | 300 | 300 | 300 |
| Melt Fracture @ 60 min | 100% | 50% | 5% | 65% | 45% | 0% | 5% | 50% |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A polymer composition comprising a polymer matrix selected from the group consisting of polyamides, polyimides, polyurethanes, polyolefins, polystyrenes, polyesters, polycarbonates, polyketones, polyureas, polyvinyl resins, polyacrylates, polymethylacrylates and combinations thereof, a first fluorine-containing processing aid, and a second processing additive system that is substantially free of fluorine and that comprises: (a) a lubricant and (b) a surfactant comprising a polyolefin-block-polyalkylene oxide oligomer.

2. The composition of claim 1, wherein the weight ratio of the first fluorine-containing processing aid to the second processing additive system is from 9:1 to 1:9.

3. The composition of claim 1, wherein the first fluorine-containing processing aid is present in an amount of from 200 to 2,500 ppm of the polymer composition.

4. The composition of claim 1, wherein the first fluorine-containing processing aid comprises a fluoropolymer.

5. The composition of claim 4, wherein the fluoropolymer comprises a homo or copolymer derived from vinylidene fluoride, hexafluoropropylene, chlorotrifluoroethylene, tetrafluoroethylene, perfluoroalkyl perfluorovinyl ethers or mixtures thereof.

6. The composition of claim 1, wherein the second processing additive system is present in an amount of from 200 to 2,500 ppm of the polymer composition.

7. The composition of claim 1, wherein the lubricant of the second processing additive system comprises a polyalkylene oxide oligomer or polymer.

8. The composition of claim 7, wherein the polyalkylene oxide oligomer or polymer has a molecular weight of from 2,000 to 50,000 g/mol.

9. The composition of claim 1, wherein the surfactant of the second processing additive system comprises a polyethylene-block-polyalkylene oxide oligomer.

10. The composition of claim 9, wherein the polyethylene-block-polyalkylene oxide oligomer has a molecular weight less than 5,000 g/mol.

11. The composition of claim 1, wherein the weight ratio of the lubricant to the surfactant in the second processing additive system is from about 1:1 to about 6:1.

12. The composition of claim 1, wherein the second processing additive system further comprises (c) an antioxidant in an amount between 0 and 20 wt % of the total weight of the second processing additive system.

13. A method of reducing melt defects produced during melt processing of a polymer matrix selected from the group consisting of polyamides, polyimides, polyurethanes, polyolefins, polystyrenes, polyesters, polycarbonates, polyketones, polyureas, polyvinyl resins, polyacrylates, polymethylacrylates and combinations thereof, the method comprising forming a blend of the polymer matrix with a first fluorine-containing processing aid, and a second processing additive system that is substantially free of fluorine and that comprises: (a) a lubricant and (b) a surfactant comprising a polyolefin-block-polyalkylene oxide oligomer.

14. The composition of claim 1, wherein the first fluorine-containing processing aid is present in an amount of from 200 to 2,500 ppm of the polymer composition and the second processing additive system is present in an amount of from 200 to 2,500 ppm of the polymer composition.

15. The composition of claim 14, wherein the first fluorine-containing processing aid comprises a fluoropolymer and the lubricant of the second processing additive system comprises a polyalkylene oxide oligomer or polymer having a molecular weight of from 2,000 to 50,000 g/mol.

16. The composition of claim 14, wherein the weight ratio of the lubricant to the surfactant in the second processing additive system is from about 1:1 to about 6:1.

17. The composition of claim 13, wherein the second processing additive system further comprises (c) an antioxidant in an amount between 0 and 20 wt % of the total weight of the second processing additive system.

* * * * *